3,244,655
POLYMER LATEX

Charles I. Sullivan, Melrose, and Panayotis D. Mallios, Boston, Mass., assignors to A. E. Staley Manufacturing Company, Decatur, Ill., a corporation of Delaware
No Drawing. Filed Aug. 29, 1960, Ser. No. 52,328
20 Claims. (Cl. 260—29.6)

This invention relates to dispersions of interpolymers in aqueous media from which cohesive and adhesive, clear, colorless glossy films may be formed upon normal air drying. More particularly, this invention relates to dispersions which may be compounded with pigments to produce a paint whose air-dried film is glossy, tack-free, flexible and enamel-like, retains its gloss and is highly resistant to water spotting.

The interpolymers of this invention are formed in a particular way from (a) at least one polymerizable ester of an alpha, beta-unsaturated carboxylic acid, (b) at least one polymerizable monovinyl aryl compound, and (c) a polymerizable alpha, beta-unsaturated carboxylic acid. Of these, the ester by itself forms soft polymers, and the aryl compound by itself forms hard polymers and tends to impart hardness and especially freedom from tack to the films formed from the interpolymer. According to the invention, the interpolymer is formed in two steps: in one step at least 70% of the ester is polymerized with or without part of the aryl monomer and preferably with at least part of the carboxylic-acid monomer and in the other the balance of the ester, the aryl and the carboxylic-acid monomers are polymerized. Either step may be performed first in the sequence but the second polymerization must be carried out in the interpolymer emulsion produced in the first step.

For convenience, reference is made hereafter to the first-named polymerization as the "film step" and to the second-named step as the "non-film step"; these names are selected to correspond with the principal monomer used in the particular polymerization.

Dispersions of interpolymers have found widespread use, especially in interior paints. However, while they are satisfactory for walls where a flat or dull finish is desired, such paints do not have the requisite gloss desired for interior application on woodwork and in other areas where gloss paint surfaces are desired. As a result, it has been necessary to use "oil" paints for these applications. While the desirability of a gloss latex paint has been evident for a long time, so far as is known no latex has been available that will dry to a glossy tack-free, hard, water-resistant surface in a paint and retain the gloss. Furthermore, "oil" paints are slow to dry and in drying they tend to pick up dust which is readily evident in a glossy surface. Upon drying, a gloss paint is expected to resist soiling to a greater degree than flat paints and to have a surface permitting easy removal of soil. It must have relatively better mar resistance and resistance to washing than flat paints. It must resist water spotting and hot cooking fats because of its use in kitchen and bath and on woodwork. Most of these characteristics are in addition to the requirements placed on the usual flat paints. These properties are attainable in the products of this invention to a high degree.

Attempts have been made to produce emulsion polymers for paints that air dry to a glossy film, but these attempts have not, to our knowledge, been successful. In some of the attempts, film gloss was attained when the paint was deposited and air dried, but the gloss was rapidly lost. In other cases, a glossy film was obtained from freshly prepared paint, but after storage of the paint, its ability to dry to a glossy film was lost. Paints prepared from the emulsions of this invention have neither of these failings; neither prolonged exposure of the paint nor prolonged storage of the paint affects the gloss of the film.

Another important quality of the films formed from the emulsions of this invention is their freedom from tack upon drying. One of the principal problems that has beset the development of emulsion gloss paints has been in this area, but the emulsions of this invention dry rapidly in air to produce films of remarkable freedom from tack.

While the polymer emulsions of this invention are described with reference to their use in paints, it will be evident that they may readily be compounded with pigments for paper coatings and used for that purpose. Without pigments, the emulsions are useful as clear coatings on paper, "pre-finished" wallboard, linoleum and other resilient floor coverings, etc.

The process of this invention by which stable, film-forming aqueous gloss-paint bases are produced comprises sequential polymerizations of these ingredients in certain balanced proportions:

(A) At least one monomeric ester of a monovinylidene alpha, beta-unsaturated acid that is polymerizable with free radical catalysts and that by itself forms a soft polymer which is normally film-forming from aqueous emulsion;

(B) At least one polymerizable vinyl aryl compound (or mixture thereof with a lower alkyl methacrylate) that is polymerizable with free radical catalysts and that forms a hard polymer which normally does not form films from aqueous emulsions; and (C) A polymerizable alpha, beta ethylenically unsaturated carboxylic acid.

The sequential polymerizations are carried out in the presence of one or more emulsion-forming water-soluble surface active agents that may be either anionic or non-ionic, but preferably are at least one of each variety. Each of the sequential polymerizations is carried out in the presence of a free-radical polymerizing catalyst that may be added to the reaction mixture all at one time or otherwise. In the final emulsion, 95 to 99.5% of the interpolymer consists of monomers (A) and (B) in a ratio of (A) to (B) in the range 2:8 to 7:3 and, correspondingly the balance, 0.5 to 5%, is monomer (C). In one polymerization, the "film step," at least 70% and preferably all of monomer (A) and up to 70% of monomer (B), but preferably not less than 10% thereof, are interpolymerized in the presence of a free-radial catalyst and one or more emulsion-producing surface active agents under conditions to form an aqueous polymer emulsion. Then, the balance of monomer (A) and of monomer (B) is added to the emulsion and polymerized under similar conditions (free-radical initiation) in the "non-film step." Monomer (C) may be part of the film step or part of the non-film step or part of both. Both polymerizations are at elevated temperatures below that at which coagulation occurs.

According to the invention, the order of the polymerizations may be reversed: first the non-film step is performed, polymerizing 30 and preferably not more than 90% of the interpolymer content of monomer (B) with up to 30% of the content of monomer (A) and then the film step monomers are polymerized in the emulsion of the non-film polymer (at least 70% and preferably all of monomer (A) together with the balance of monomer (B)). Again the distribution of monomer (C) is flexible.

Before use in formulating a paint the resulting interpolymer emulsion is made alkaline (to pH below 10 and preferably between 9.0 and 9.5) with ammonia preferably, although a water-soluble amine or an alkali metal base may be used at least in part.

When a water-base gloss paint is to be prepared, the interpolymer emulsion is made alkaline and then mixed with dispersed pigments, coalescing agents, and other paint ingredients to produce the paint properties desired. It was found that interpolymer dispersions prepared in this way and the water-base paints made therewith are very stable and, upon drying, deposit adhesive and cohesive films that are glossy and retain their gloss, that are flexible, that are tack-free and that are water-, stain-, and scrub-resistant. Further, the emulsions and paints made therewith have good application properties—leveling, ease of brushing, etc. Paints made with these emulsions meet the criteria for gloss interior trim paints where enamels have been used heretofore.

The expressions "film-forming" and "non-film-forming" have reference to the ability of the interpolymer to deposit continuous, coherent film from an aqueous emulsion of the polymer simply by evaporation of the water at ambient temperatures. In this application, these expressions are used in reference to normal indoor ambient temperatures covering a range of say, 40 to 110° F., although the minimum film-forming temperature may be lower. The minimum film-forming temperature of a polymer emulsion may be measured, as is known, by spreading a sample of the emulsion in a thin film on a metal bar heated at one end and cooled at the other to maintain a temperature gradient. The emulsion is dried by evaporation. The position of the transition from continuous to discontinuous film is observed and correlated with the measured temperature of the metal bar in the region of the transition. Polymers made from monomers (A) and (B) of this invention are spoken of in these terms.

As monomer (A), the polymerizable film-forming ester of a monovinylidene alpha, beta-unsaturated acid that by itself yields soft polymers, there is used an alkyl acrylate in which the alkyl substituent is primary or secondary and contains one to eight carbon atoms or an alkyl methacrylate having equivalent softness and film-forming characteristics, i.e., those of 4 to 12 carbon atoms. The acrylates include the ethyl, propyl, isopropyl, butyl, iso-butyl, sec. butyl, amyl, isoamyl, hexyl, 2-ethylhexyl and octyl esters of acrylic acid. Methyl acrylate, which forms a harder polymer, may be used in concentrations up to 60% of the total of monomer (A). The equivalent methacrylates include the butyl, iso-butyl, amyl, isoamyl, hexyl, heptyl, octyl, decyl and dodecyl esters. A small proportion of this monomer (up to about 5% by weight of the total monomer content of the interpolymer of this invention) may be replaced by an alkyl acrylate or methacrylate having more carbon atoms than these and up to 18 carbon atoms. This replacement is advantageous since the higher molecular weight alkyl acrylates tend to plasticize the films formed from the final interpolymer. These compounds include decyl-octyl acrylate, lauryl acrylate, decyl-octyl methacrylate, lauryl methacrylate, stearyl methacrylate, etc. Monomer (A) is, therefore, at least one monomer of the formula:

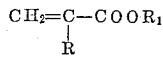

in which R is hydrogen or methyl and $R_1$ represents, when R is hydrogen, an alkyl group (primary or secondary) of up to 8 carbon atoms and, when R is methyl, an alkyl group of 4 to 12 carbon atoms and may include up to 5% of the total of monomers similar esters whose alkyl groups have longer chains up to 18 carbon atoms. The last are alkyl acrylates of 9 to 18 carbon atoms and alkyl methacrylates of 13 to 18 carbon atoms.

As monomer (B), the polymerizable non-film-forming monovinyl aryl compound that by itself yields hard polymers, there may be used styrene and vinyl toluene, which are preferred, and other ring-substituted styrenes such as alkoxy styrenes (e.g., methoxy styrene), alkyl styrenes (e.g., ethyl styrene, diethyl styrene), halostyrenes (e.g., 2,5-dichlorostyrene), etc. Also, mixtures of the mono- vinyl aryl compound with methacrylates that form hard polymers may also be used, i.e., alkyl methacrylates of up to three carbon atoms. When such mixtures are used, not more than 75% of the styrene may be replaced with such lower alkyl methacrylates. The preferred non-film-forming monomers may be used alone or in mixtures with each other or one may use one of these monomers in the first polymerization and another in the second. It has been found that excellent films are formed when a small proportion of the preferred non-film-forming monomers (up to 5% of the total monomer weight) is replaced with a cross-linking agent, e.g., divinyl benzene. The cross-linking agent appears to increase the hardness and resistance to water spotting of the film without significantly affecting its other properties.

The terms "hard" and "soft" are used herein in referring to polymers formed from the monomers polymerized alone, in the way that is common in this technology. (See Riddle, "Acrylic Esters," Reinhold, New York, 1954, page 58 ff; also Patent Number 2,795,564.) Generally speaking, this refers to the "brittle point" of the polymer, i.e., the temperature at which the polymer breaks on flexing. The soft monomers useful in this invention have brittle points of about 15 to 20° C. and below.

As monomer (C), the polymerizable alpha, beta-unsaturated monovinyl carboxylic acid, there is used acrylic acid, methacrylic acid, or other lower-alkyl alpha-substituted acrylic acid, itaconic acid or half esters of itaconic acid (for example, the monomethyl, monoethyl, monobutyl, monohexyl and mono-2-ethylhexyl esters). While salts of the acid such as the ammonium and alkali metal salts may be used, they are difficult to interpolymerize and, to assure the introduction of the carboxyl groups in the interpolymer, the free acid should be used. These are characterized by the formula:

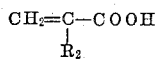

in which $R_2$ is H, lower alkyl (up to 6 carbon atoms), $CH_2$—COOH or $CH_2$—$COOR_3$, $R_3$ being lower alkyl (up to 8 carbon atoms).

At least one of each of the three varieties of monomer must be present in the final interpolymer, but their distribution during the two steps of polymerization may vary considerably. Seventy to 100% of the polymerizable ester, monomer (A), is polymerized or interpolymerized in the film step of polymerization. While monomer (A) may be used alone, preferably it is copolymerized with some, but less than 70%, of the monovinylidene aryl compound, monomer (B), and with at least some of the alpha, beta-unsaturated carboxylic acid, monomer (C). Preferably, the film interpolymer contains at least 10% of the total of monomer (B) and at least 10% and up to 100% of the total monomer (C). In the non-film stage of polymerization, not more than 30% of monomer (A) is polymerized with the balance of monomers (B) and (C), if any. It appears that as the total proportion of monomer (B) is increased in the method, the proportion of the total of monomer (A) that is permissible in the non-film step must be decreased roughly in proportion for any species of monomer (A). Preferably the non-film step is performed with monomer (A) completely absent.

It is believed that monomer (B) is responsible for at least the low tack and hardness and possibly some of the gloss of the films produced from the final interpolymer emulsion. However, until now it has been difficult to obtain a film-forming emulsion containing a concentration of polymerized monovinyl aryl compounds sufficient to impart so low a level of tack to such films and to retain the flexibility and gloss. That the interpolymer emulsions of this invention have this capability is believed to be the result of the very high concentrations of monomer (B) that are attainable. It is believed that such high concentrations in a stable emulsion are responsible for these improved properties because the monomers of the second interpolymerization enter the polymer particles of the first interpolymerization and become intimately dispersed and polymerized therein, with the interdispersed molecules retaining the characteristics of the polymer of each stage of polymerization rather than the properties typical of a conventional copolymer. These particles may be thought of as a flexible mass which is "filled" with "hard" polymer molecules. This permits the use of more styrene, for example, which reduces tack and promotes hardness and good gloss properties.

This reasoning is based on observations of the character of the films formed from the interpolymers of this invention. It was observed that interpolymers formed in a single stage of polymerization using the same concentrations of monomers were stiff, brittle and generally unsatisfactory, and that this was quite opposite to films deposited from emulsions produced according to the invention. Then, too low a proportion of monomer (B) in the non-film interpolymer permits a film to be formed but it is too tacky and soft. Too high a proportion of monomer (B) produces a brittle film unsatisfactory for paints or other surface coating applications. Because each of the monomers seems to perform individual functions in the final product, it is necessary to balance carefully the proportions used.

The proportion of monomer (A), the soft, film-forming polymerizable ester is between 19 and 69.7% by weight of the total of all monomers in the interpolymer, i.e., 20 to 70% of the total of monomers (A) and (B) which are 95 to 99.5% of all monomers used. With more than about 70% of monomer (A), the concentration of monomer (B) is too low to impart the necessary freedom from tack. On the other hand, with a concentration of less than 20%, the film character of the interpolymer emulsion is unsatisfactory because it is too brittle and stiff. However, there is some variation in this range that depends on the particular acrylic ester used. To illustrate with styrene as monomer (B), typical balanced proportions in the final interpolymer, including 0.5 to 5% of monomer (C), are ethyl acrylate-styrene 70:30 to 33:67, butyl acrylate-styrene 60:40 to 30:70, and 2-ethylhexyl acrylate-styrene 55:45 to 25:75. It will be noted that with those species of monomer (A) that produce softer films, the proportion of the non-film-forming aryl monomer can be increased.

The proportion of monomer (C), the monovinylidene carboxylic acid, is balanced with the character and content of the other monomers. If the acid is used in neither the film polymerization nor the non-film polymerization, the emulsion tends to lack stability. The manner in which the monovinylidene carboxylic acid is used depends somewhat on the particular acid. With methacrylic acid, if the entire concentration is used in the film polymerization, the film from the emulsion tends to be relatively stiffer and less resistant to water spotting and also the interpolymer emulsion has a higher viscosity. However, it is preferable to have part of the methacrylic acid in the film polymerization, at least 10% of the total weight of monomer (C). On the other hand, itaconic acid, lower alkyl monoesters of itaconic acid and acrylic acid are both satisfactory when the entire concentration is polymerized in the film polymerization step, i.e., with monomer (A). It was noted that, as the proportion of non-film-forming monomer (B) was increased, it was desirable to reduce the proportion of monomer (C) to preserve the same degree of film flexibility. The proportion of monomer (C) is chosen to impart stability, viscosity, and leveling properties without development of water sensitivity or brittleness. The use of monovinylidene carboxylic acids to incorporate carboxyl groups in interpolymers of this type for the same purposes is known, and the particular concentration necessary to impart desired properties can be readily determined with little experimentation by those skilled in the art.

The surface active agents which have been found useful for dispersal or emulsification of the interpolymer may be chosen from a wide variety of anionic and nonionic surface active agents. Two or more surface active agents are frequently used of one or both types, and it is preferred to use both an anionic and a nonionic in combination. The preferred nonionic surface active agents are composed of a hydrophobic hydrocarbon portion and a hydrophilic portion. The latter is a chain of 2 to 120 oxyethylene units while the former has an alkyl group of 4 to 18 carbon atoms which may be linked to the oxyethylene chain through a phenoxy group. Generally speaking, as the length of the hydrocarbon chain in the monomer mixture increases, non-ionic surface active agents of reduced number of oxyethylene groups should be used, i.e., those of greater oil solubility. Anionic surface active agents are also useful and it is preferred to include both varieties in the emulsion. The anionic surface active agents normally have a hydrophillic anion and a hydrophobic cation. The same principles guide the selection of the anionic surface active agent. Typical of the useful anionic surface active agents are ammonium or alkali metal (e.g., sodium) salts of alkyl (e.g., lauryl) ether sulfate, ammonium or alkali metal salts of alkyl phenoxypolyoxyethylene ethanol sulfate esters (and similar polyoxyethylene derivatives), tetra sodium salt of N-(1,2 dicarboxyethyl) N-octadecyl sulfosuccinamate, alkali metal and ammonium salts of polyelectrolytes, sodium alkyl (e.g., lauryl) sulfate, etc. In large measure, the selection of surface active agent is empirical because it must be compatible not only with the dried interpolymer but also with the materials with which the emulsion is later compounded as in a paint. The principles guiding the selection of a surface active agent (or agents) for the present interpolymer emulsion are the same as for prior interpolymer emulsions designed for paint or other surface coatings.

The amount of surafce active agent (or agents) required varies primarily with the concentration of monomers to be handled and to a minor extent with the choice of emulsifier, monomers, proportions of monomers and catalyst. Generally, the amount of surface active agent is between 1% and 10% of the total monomer weight and preferably between 1% and 4%. Somewhat the same principles apply in the selection of the amount as in the selection of the surface active agent itself. The proportion must be sufficient to impart the necessary stability, desired rate of polymerization and particle size without development of water-sensitivity or incompatibility in the dried film.

As polymerization catalyst there may be used one or more of the peroxidic compounds that are known to act as free radical catalysts and which may have at least some solubility in aqueous solutions of the emulsifier or may be soluble only in the monomer phase. Among the useful catalysts for the present type of interpolymerization are the persulfates, including the ammonium, sodium and potassium salts, hydrogen peroxide, the perborates. Also useful are the organic peroxides and hydroperoxides. These include benzoyl peroxide, tert-butyl hydroperoxide, diisopropyl benzene hydroperoxide, cumene peroxide, caproyl peroxide, methyl ethyl ketone peroxide, etc. Other free-radical catalysts are also useful, such as azodiisobutyronitrile and other aliphatic azo compounds of the type having an acylic azo group and an aliphatic carbon atom on each nitrogen, at least one of which is tertiary. In part, the particular combination of monomers governs the selection of the inorganic or organic peroxidic catalyst since some monomers respond better to one variety than they do to another.

The amount of peroxidic catalyst required is about proportional to the concentration of the monomers used. The usual range is 0.01% to 3% of catalyst based on weight of monomers in each step of the process. The preferred range is 0.05% to 0.5% in each step. It is entirely possible to add sufficient of the catalyst in the polymerization performed first to take care of the polymerization performed second. Alternatively, the catalyst may be added in two portions, or a different catalyst can be used in the second polymerization because the monomers used respond better to a different catalyst.

Frequently a promoter for the catalyst (sometimes called an "accelerator" or "adjuvant") is used to hasten the reaction at a sufficiently low temperature to avoid coagulation. The promoter may be a reducing agent and together with the peroxidic catalyst is frequently referred to as a "redox system." Many examples of such systems are known, and the promoters include ascorbic acid and soluble sulfites, hydrosulfites, sulfoxalates, thiosulfates, sulfites and bisulfites. Particular promoters are exemplified by sodium hydrosulfite, sodium metabisulfite, zinc or sodium formaldehyde sulfoxalate and calcium bisulfite. Polyvalent metal ions are also used in small concentrations, particularly ferrous ion in the form of ferrous ammonium sulfate at concentrations of a few parts of ferrous ion per million. Frequently only promoter is used in the second polymerization to activate the peroxidic catalyst already present.

The amount of promoter required varies, as is known, with the free-radical initiator chosen and with the particular promoter. The emulsifying agent also affects somewhat the amount used as does the particular monomers. At the outside, not more than 3% nor less than 0.01% is used in these situations. The preferred range of ascorbic acid is at the low end of this range up to about 0.5% while sulfites are used preferably in an amount of 0.2 to 1%.

The temperature of polymerization of each step of the process is kept below about 95° C. and above about 30° C. and preferably in the range of 50 to 85° C. During each polymerization, control over the temperature can be exercised by regulating the rate of addition of the monomers or of the catalyst or by cooling or any combination of them.

In performing the process, it is preferred to make up separate premixtures, as follows: (1) a catalyst-emulsifier premixture which contains at least sufficient catalyst and surface active agent for the first polymerization and the bulk of the water for emulsion; (2) a film monomer premixture which contains at least 70% and preferably all of the film-forming monomer, monomer (A), part of the non-film-forming monomer, monomer (B), and preferably at least part of the alpha, beta-unsaturated carboxylic acid, monomer (C); and (3) a non-film monomer pre-mixture which contains the balance of the non-film-forming monomer, the balance of the alpha, beta-unsaturated carboxylic acid, and the balance of the film-forming monomer, if any. Additional catalyst and/or promoter may be added for the second polymerization step. Also, additional surface active agent may be added, the same as that used in the first step or different.

In the preferred method of performing the reaction, the catalyst-emulsifier solution is prepared in hot water (50 to 85° C.). To this the film-monomer pre-mixture is added and the polymerization proceeds. The addition takes place over a period of time sufficient to permit the temperature to be controlled throughout the reaction. When the first (film) reaction is complete, the non-film-monomer premixture is added. Then additional catalyst and adjuvant are added with a part of the promoter being withheld and added gradually over a period of time to maintain a fairly constant concentration of catalyst throughout the polymerization. Finally, the balance of the promoter is added and the reaction is permitted to go to completion.

When the desired interpolymer content is achieved, the dispersion is cooled. The cooled dispersion may be neutralized, preferably with ammonia as described before.

Details of the preparation of the dispersions of this invention are provided in the following illustrations in which parts and percentages are by weight. It is to be understood that the invention is not limited to the details disclosed.

*Example 1*

The following premixtures were prepared to be used in preparing a 50% solids interpolymer latex:

| | Parts |
|---|---|
| Catalyst-emulsifier premixture: | |
|   Potassium persulfate | 0.4 |
|   25% solids aqueous solution of sodium salt of lauryl ether sulfate | 6.0 |
|   25–30% solids aqueous solution of sodium salt of polymethacrylic acid having a molecular weight in the range of 8000 to 13,000 with an average molecular weight of about 10,000 as determined by solution viscosity measurements, hereinafter referred to as "aqueous sodium salt of polymethacrylic acid" | 4.0 |
|   Water | 91.7 |
| Film-monomer premixture: | |
|   Ethyl acrylate | 59.7 |
|   Styrene | 19.9 |
|   Methacrylic acid | 1.5 |
| Non-film-monomer premixture: | |
|   Styrene | 15.9 |
|   Methacrylic acid | 3.0 |
| Second catalyst premixture: | |
|   60% solids aqueous solution of tertiary butyl hydroperoxide | 0.04 |
| Promoter solution: | |
|   0.01% solids aqueous solution of ascorbic acid | 4.0 |

The emulsifier premixture was prepared in hot water (167° F.) in a suitable glass-lined reactor fitted with a stirrer and jacket. The film-monomer premixture was added continuously over a period of 90 minutes. After the first three minutes, the temperature began to rise and when it reached 170° F. the rate of addition was increased slightly. The remainder of the reaction was carried out between 172–182° F. When the reaction was complete, the interpolymer emulsion produced was cooled to 170° F. and then the non-film monomer premixture was added. The entire mass was agitated for 30 minutes and then the second catalyst premixture was introduced; next, one-third of the promoter premixture was added. Shortly thereafter, the second interpolymerization began as indicated by a rise in temperature. Then the remainder of the adjuvant premixture was added over a period of 15 to 20 minutes. The temperature rose to about 190° F. and was maintained there for one hour. Then the batch was cooled to about 125° F.

There was formed a stable, coagulum-free interpolymer latex at about 50% solids, having a pH of about 5.5. At this pH, the viscosity was 500 cps.; when neutralized to a pH of 8.8 with 26° Bé. ammonia, the viscosity was about 2,000 cps. The monomer content was less than 0.3% and the particle size was uniform at about 0.1 micron.

The interpolymer latex was drawn down on a glass plate with a calibrated gage to form 10-mil film. The film was dried at 60° F. and at 80° F. overnight. In each case, a continuous dry film was formed that was clear, glossy, tack-free, and quite tough and flexible. The films displayed unusually low drag when the fingers were drawn across them.

The films were subjected to additional tests. The film formation temperature was determined to be 52 to 54° F. The gloss of the film was determined on a Gardner gloss meter both immediately after a film was prepared and after 30 weeks storage of the film exposed to a laboratory atmosphere. This measurement was made at a 60° angle of incidence on a 3-mil dry film deposited on a Morest Hiding Power Chart. The reading immediately after drying was 85 to 90, and after 30 weeks it was the same. A film was also prepared from the latex after storage in a sealed can for 30 weeks, and again the same gloss measurement was obtained.

The film prepared from the interpolymer latex was also tested for its wet-rub resistance. A film 2 mils in thickness was prepared over a 2 mil enamel undercoat on glass and aged 96 hours. The wet-rub resistance was determined on a Gardner Straight Line Washability Machine and the film was unaffected after 3000 cycles on the machine.

*Example 2*

This example illustrates the preparation of a gloss paint from the interpolymer latex prepared by the method of Example 1. A pigment grind was prepared from the following materials by mixing in a pebble mill until uniform:

| | Parts |
|---|---|
| Water | 100 |
| Aqueous sodium salt of polymethacrylic acid | 2 |
| Water dispersible lecithin | 2 |
| 50% solution Colloid #602, a commercial foam suppressant | 5 |
| Tributoxyethyl phosphate | 14 |
| Metasol 57, a phenyl mercury preservative | 0.25 |
| 15% solids aqueous casein solution | 65 |
| Titanium dioxide (enamel grade) | 200 |

The interpolymer latex of Example 1 was adjusted with ammonia to a pH of 9.0 to 9.5 and mixed with 62 parts of water and 5 parts of 50% solution Colloid #602, as foam suppressant. The pigment grind was then mixed with the adjusted latex to form the paint. The finished paint had a pH of 9.0 to 9.5, weighed 10 pounds per gallon, had a total non-volatile content of 50% and had a viscosity of 68–74 Krebs units.

The gloss of the paint was tested as described for the interpolymer latex of Example 1 and on an average, the paint is in the range of 70–80 on the Gardner Gloss Meter. The paint was also subjected to test on the Washability Machine as described in Example 1, and at the end of 3000 cycles appeared unaffected. The paint was aged in cans for 30 weeks at room temperature and its performance tested. It was identical with the freshly prepared paint.

*Example 3*

This example illustrates the difference in properties of the interpolymer latex when prepared in a single stage of polymerization in which all of the monomers used were interpolymerized. The following premixtures were prepared:

| | Parts |
|---|---|
| Catalyst-emulsifier premixture: | |
| Potassium persulfate | 0.5 |
| Aqueous radium salt of polymethacrylic acid | 4.0 |
| 25% solids aqueous solution of sodium salt of lauryl ether sulfate | 6.0 |
| Water | 91.7 |
| Combined film- and non-film-monomers premixtures: | |
| Ethyl acrylate | 59.7 |
| Styrene | 35.8 |
| Methacrylic acid | 4.5 |

The reaction was performed in the same way as the first stage of polymerization in Example 1 except that the time of addition was increased to correspond to the increase in the amount of monomer added. When the reaction was complete, the 50% solids interpolymer emulsion had a pH of 5.5 and a viscosity of 120 centipoises. Upon neutralization with ammonia, as described in Example 1, to a pH of 9.0, the viscosity rose to over 40,000 centipoises. A film was prepared from the interpolymer latex and it was stiff and brittle at room temperature, 60–80° F., and generally unsatisfactory for coating purposes as a paint or otherwise.

*Example 4*

This example illustrates the production of the interpolymer latex of this invention when the order of the two stages of interpolymerization are reversed. The same premixtures as in Example 1 were prepared. The interpolymerization was carried out in the same manner except that the non-film-monomer premixture was substituted for the film-monomer premixture and the film-monomer premixture was substituted for the non-film-monomer premixture. The results were essentially the same as those obtained following the procedure of Example 1.

*Example 5*

This example illustrates the preparation of an interpolymer latex according to this invention in which the ratio of styrene to ethyl acrylate is increased to 60:40. In addition, there are illustrated the use of other emulsifiers and a different catalyst. The following premixtures were prepared:

| | Parts |
|---|---|
| Emulsifier premixture: | |
| 30% solids solution of sodium laryl sulfate | 3.33 |
| Alkyl phenoxy polyoxyethylene glycol ether | 1 |
| Water | 81.22 |
| Film monomer premixture (with catalyst): | |
| Styrene | 10 |
| Ethyl acrylate | 40 |
| Methacrylic acid | 1.25 |
| Diisopropyl benzene hydroperoxide | 0.2 |
| Promoter premixture: | |
| Ascorbic acid | 0.4 |
| Water | 10 |
| Second emulsifier premixture: | |
| 25% solids aqueous solution of sodium salt of lauryl ether sulfate | 4 |
| Aqueous sodium salt of polymethacrylic acid | 2 |
| Water | 10 |
| Non-film monomer premixture (with catalyst): | |
| Styrene | 50 |
| Methacrylic acid | 2.5 |
| Diisopropyl benzene hydroperoxide | 0.2 |

The procedure followed was similar to Example 1. Here, however, a monomer-soluble catalyst was used. The film monomer premixture (including the catalyst) was added to the first emulsifier premixture at 70° C. over a period of one hour during which half the promoter premixture was also added. After the first polymerization was complete, the second emulsifier premixture was added. Then the non-film monomer premixture and the other half of the promoter premixture were added over a one-hour period. The reaction was complete within another hour. The emulsion was stable, and an air dried film of the emulsion was clear, glossy, tack-free and flexible.

*Example 6*

This example illustrates the effect of polymerizing all of the monomers together but performing the reaction in two steps, i.e., with the film monomer distributed equally between the two polymerizations. The following premixtures were prepared:

| | Parts |
|---|---|
| Emulsifier premixture: | |
| 30% solids aqueous solution of sodium lauryl sulfate | 3.33 |
| Alkyl phenyl polyethylene glycol ether | 1.0 |
| Water | 71.22 |
| Combined film- and non-film-monomer premixture: | |
| Styrene | 60 |
| Ethyl acrylate | 40 |
| Methacrylic acid | 3.75 |
| Diisopropyl benzene hydroperoxide | 0.4 |

Second emulsifier premixture:
 Aqueous sodium salt of polymethacrylic
  acid _____ 2.0
 25% solids aqueous solution sodium salt of
  lauryl ether sulfate _____ 4.0
 Water _____ 10.0
Promoter premixture:
 Ascorbic acid _____ 0.4
 Water _____ 20.0

The polymerization followed essentially the same procedure as that used in Example 5 with these exceptions: half the monomer mixture was used in the first polymerization together with half of the promoter premixture. At the conclusion of the first polymerization, the second emulsifier solution was added and then the balance of monomer and promoter. There was a small amount of coagulation in the emulsion but the emulsion was otherwise fairly stable. However, the film deposited from the emulsion was very hazy on drying and extremely brittle.

*Example 7*

This example and the next two illustrate the use of butyl acrylate as the film monomer in place of ethyl acrylate. The following premixtures were prepared:

|  | Parts |
|---|---|
| Film monomer (including catalyst): |  |
|  Styrene | 15 |
|  Butyl acrylate | 30 |
|  Methacrylic acid | 1.25 |
|  Diisopropyl benzene hydroperoxide | 0.2 |
| Non-film monomer premixture (including catalyst): |  |
|  Styrene | 55 |
|  Methacrylic acid | 2.5 |
|  Diisopropyl benzene hydroperoxide | 0.2 |

First emulsifier premixture, second emulsifier premixture, and promoter premixture were the same as in Example 5.

The polymerization was carried out in the same manner as Example 5. There was a small amount of coagulation (2 to 3%). The film prepared from the resulting interpolymer was clear and glossy. It had negligible tack and was somewhat stiffer than the film prepared according to Example 1, and this indicates that the ratio of film-forming monomer to non-film-forming monomer was about at the minimum (30:70).

*Example 8*

The procedure of Example 1, with butyl acrylate substituted for ethyl acrylate, produced results as good as those obtained with Example 1, except that the flexibility of the film was slightly better and quite tacky. A control experiment using the procedure of Example 3 (with all monomers co-polymerized at once) produced an emulsion which, on drying, left a clear but very brittle film.

*Example 9*

Essentially the same procedure as in Example 1 was repeated with slightly altered proportions of styrene and butyl acrylate in place of ethyl acrylate. In this case, the film-monomer premixture contained 10 parts of styrene and 46 parts of butyl acrylate, while the non-film premixture contained 40 parts of styrene. Again the film was clear, flexible, glossy, and quite elastic with but slight tack.

*Example 10*

This example and the next two illustrate the preparation of the interpolymer emulsion of this invention using 2-ethylhexyl acrylate in place of ethyl acrylate. The following premixtures were prepared:

|  | Parts |
|---|---|
| Film monomer premixture (including catalyst): |  |
|  Styrene | 20 |
|  2-ethylhexyl acrylate | 30 |
|  Methacrylic acid | 1.25 |
|  Diisopropyl benzene hydroperoxide | 0.2 |
| Non-film monomer premixture (including catalyst): |  |
|  Styrene | 50 |
|  Methacrylic acid | 2.5 |
|  Diisopropyl benzene hydroperoxide | 0.2 |

First emulsifier premixture, second emulsifier premixture, and promoter premixture the same as in Example 5.

The procedure followed was the same as in Example 5. The emulsion formed had a minor amount of coagulation. The film formed from the interpolymer emulsion was clear, glossy, with negligible tack, and somewhat stiffer than that of Example 5, although still satisfactorily flexible. This indicates that the proportion of film monomer to non-film monomer is near the minimum.

*Example 11*

The procedure of Example 10 was followed in all its essential details, except that the proportions of styrene and 2-ethylhexyl acrylate in the film-monomer premixture were 15 and 40 parts respectively and the styrene proportion in the non-film-monomer premixture was 45 parts. The film was glossy, clear and flexible and has slightly more tack than that of Example 10.

Essentially the procedure of Example 6 was repeated with these proportions and the film produced therefrom was very stiff and brittle, although clear.

*Example 12*

The procedure of Example 10 was followed in all its essential details, except that the proportions of styrene and 2-ethylhexyl acrylate in the film monomer premixture were 10 and 46 parts respectively and the styrene proportion in the non-film monomer premixture was 40 parts. A glossy, flexible film was deposited on drying a film of the emulsion produced.

With the same proportions, but following a procedure similar to Example 6, a relatively tackier film was produced.

*Example 13*

The following premixtures were prepared:

|  | Parts |
|---|---|
| Film monomer premixture: |  |
|  Styrene | 15 |
|  Methyl acrylate | 35 |
|  Butyl acrylate | 30 |
|  Methacrylic acid | 1.5 |
| Non-film monomer premixture: |  |
|  Styrene | 16 |
|  Methacrylic acid | 3.0 |

Emulsifier catalyst premixture, second catalyst premixture and promoter premixture were the same as in Example 1. The procedure followed was the same as that of Example 1. The results were comparable in the clarity, gloss and flexibility of the film formed by drying a layer of the interpolymer emulsion. There was, however, a minor amount of coagulation in the emulsion.

For comparison the same monomer proportions were used in preparing an emulsion according to the method of Example 3. The film produced was stiff and brittle, although clear and glossy.

*Example 14*

This example illustrates the use of a mixture of film-forming monomers in the place of ethyl acrylate. The procedure followed was essentially that of Example 1 except that the monomer premixtures were as follows:

| | Parts | Parts |
|---|---|---|
| Film monomer premixtures: | | |
| Styrene | 8.4 | 8.4 |
| Ethyl acrylate | 35.2 | 40.2 |
| Butyl acrylate | 15.0 | 10.0 |
| Methacrylic acid | 1.5 | 1.25 |
| Non-film monomer premixture: | | |
| Styrene | 37.6 | 37.6 |
| Methacrylic acid | 2.5 | 2.5 |

In both cases a film satisfactory for the purposes of this invention was produced by drying the interpolymer latex.

*Example 15*

This example illustrates the use of another mixture of two film-forming monomers in the place of ethyl acrylate, in this case ethyl acrylate and 2-ethylhexyl acrylate. The procedure followed was the same as Example 1 except that 15 parts of ethyl acrylate was replaced by 15 parts of 2-ethylhexyl acrylate. A satisfactory film was deposited from the stable interpolymer emulsion produced.

*Example 16*

This example illustrates the use of mixtures of styrene and a lower alkyl ester of methacrylic acid as monomer (B). These lower alkyl esters by themselves form hard polymers. The procedure used was that of Example 1 in which the monomer pre-mixtures were as follows:

| Film monomer premixtures: | Parts |
|---|---|
| Styrene | 10 |
| Methyl methacrylate | 20 |
| 2-ethylhexyl acrylate | 45 |
| Methacrylic acid | 2 |
| Non-film monomer premixtures: | |
| Styrene | 10 |
| Methyl methacrylate | 10 |
| Methacrylic acid | 2 |

The emulsion formed contained a trace of coagulation. The film deposited from this emulsion was clear, glossy, relatively tacky and very flexible.

*Example 17*

This and the next example illustrate the use of higher alkyl methacrylates as film-forming monomer. These higher methacrylates by themselves form soft polymers. The procedure of Example 1 was followed except that the monomer premixtures were changed to these:

| Film monomer premixtures: | Parts |
|---|---|
| Styrene | 15 |
| Butyl acrylate | 35 |
| Butyl methacrylate | 30 |
| Methacrylic acid | 1.5 |
| Non-film monomer premixtures: | |
| Styrene | 16 |
| Methacrylic acid | 3 |

The film formed from the emulsion was clear, glossy and very flexible with a small degree of tack.

*Example 18*

An interpolymer emulsion was prepared by the method of Example 1 using the following monomer premixtures:

| Film monomer premixtures: | Parts |
|---|---|
| Styrene | 15 |
| Butyl acrylate | 35 |
| Hexyl methacrylate | 30 |
| Methacrylic acid | 1.5 |
| Non-film monomer premixtures: | |
| Styrene | 16 |
| Methacrylic acid | 3 |

The film formed from the interpolymer emulsion and dried at room temperature was clear, glossy and very flexible but had some tack.

*Example 19*

This example illustrates the use of a higher alkyl acrylate in the place of part of the ethyl acrylate. The procedure followed was essentially the same as Example 1 except that 5 parts of ethyl acrylate was replaced by 5 parts of decyloctyl methacrylate. The emulsion produced was equivalent to that of Example 1, and the film deposited from the interpolymer emulsion was clear and very flexible with high gloss and excellent water-spotting resistance. It was found that replacing all of the ethyl acrylate or only one-third of the ethyl acrylate with decyloctyl methacrylate did not permit the interpolymerization to proceed satisfactorily under these conditions, and a large proportion of the decyloctyl methacrylate reacted to form a homopolymer or was left unpolymerized.

*Example 20*

This example illustrates the addition of a cross-linking reagent to replace part of the styrene. The cross-linking agent used was divinyl benzene. The procedure followed was the same as Example 1 except that the non-film monomer premixture contained 11 parts of styrene and 5 parts divinyl benzene instead of 16 parts styrene. The divinyl benzene used was the commercial preparation which is 20% divinyl benzene, the balance being vinyl ethyl benzene and vinyl diethyl benzene. The film deposited from the stable interpolymer emulsion was clear, flexible, tack-free and glossy and had excellent resistance to water-spotting.

Similar interpolymer emulsions were prepared varying the proportions of styrene in the film and non-film monomer premixtures. In one experiment, the styrene was distributed with 8.5 parts in the film monomer premixture and 32.5 parts in the non-film monomer premixture. In a second experiment, the proportions were 10 and 45 respectively. In the first, the ethyl acrylate content was 50 parts and in the second, 40 parts. In both instances, excellent films were deposited from the interpolymer emulsions. It was also found that if more than five parts of divinyl benzene was used, the interpolymer emulsion tended to be unstable and the films were excessively brittle.

Similar results were obtained when the non-film premixture contained either 2.0 parts of diallyl itaconate or 2.0 parts of polyethylene glycol dimethacrylate in place of the divinyl benzene. These monomers are also cross-linking agents.

*Example 21*

This example illustrates the use of vinyl toluene in the place of styrene. The procedure followed was the same as Example 1 except that all of the styrene was replaced by vinyl toluene. The film deposited from the resultant interpolymer emulsion was about as good as that produced by the method of Example 1. The film had slightly better gloss, but was slightly hazy and stiffer. The method of Example 3 (single step interpolymerization with the same proportions) was repeated with vinyl toluene for comparison. The film was extremely brittle.

*Example 22*

Vinyl toluene was again used in the method of Example 1 with the monomer proportions changed as follows:

| Film monomer premixtures: | Parts |
|---|---|
| Vinyl toluene | 10 |
| Ethyl acrylate | 46 |
| Methacrylic acid | 1.25 |
| Non-film monomer premixture: | |
| Vinyl toluene | 40 |
| Methacrylic acid | 2.5 |

The method of Example 3 was repeated with these proportions for purposes of comparison. The results were the same as in Example 21.

*Example 23*

This example illustrates the use of itaconic acid in place of methacrylic acid as a source of carboxyl groups. The following premixtures were prepared:

| | Parts |
|---|---|
| Catalyst-emulsifier premixture, with carboxyl monomer): | |
| 57.7% solids aqueous solution of ammonium salt of the sulfate ester of an alkyl phenoxy polyoxyethylene ethanol | 1.3 |
| Nonylphenoxy ether of polyoxyethylene | 1.5 |
| Ammonium persulfate | 0.4 |
| Itaconic acid | 3.5 |
| Water | 102.75 |
| Film monomer premixture: | |
| Ethyl acrylate | 60 |
| Styrene | 20 |
| Additional emulsifier premixture: | |
| Sodium salt of alkyl aryl polyether sulfate | 1 |
| Water | 3 |
| Ammonium hydroxide (28° Be.) | 1 |
| Non-Film monomer premixture: | |
| Styrene | 20 |
| Catalyst premixture: | |
| Sodium persulfate | 0.1 |
| Water | 2.0 |

The method of Example 1 was followed except that second emulsifier premixture was added just before the second polymerization (at 55° C.). The non-film monomer premixture was added at 70° C., and the catalyst was added in two equal portions, the second portion after the rate of reaction had slowed considerably. The interpolymer emulsion produced had a pH of 4.9 and viscosity of 116 centipoises. When neutralized with ammonia to a pH of 7.5, the viscosity was 1,640 centipoises, and at a pH of 8.5 it was 4,000 centipoises. The film formed by drying a layer of the interpolymer emulsion was exceptionally clear, glossy, flexible and adherent. Furthermore, it had exceptional water-resistance; soaking the film for five days in water did not appreciably affect it.

Similar results were obtained with two parts of itaconic acid in place of the 3½ except that the viscosity of the emulsion was reduced.

*Example 24*

This example illustrates the substitution of acrylic acid for methacrylic acid. The procedure followed was the same as Example 22 except that the 3½ parts of itaconic acid was replaced by 3.0 parts of acrylic acid and the styrene content in the non-film monomer premixture was reduced to 16 parts. A very good interpolymer emulsion was produced and films therefrom had excellent water resistance although not quite so good as that produced using itaconic acid.

*Example 25*

This example illustrates the use of monobutyl itaconate as the carboxyl-furnishing monomer in place of methacrylic acid. The procedure followed was substantially identical to that of Example 1 except that monobutyl itaconate was substituted for the methacrylic acid. The results were essentially the same as those obtained according to Example 1 with the exception that the film was much more flexible and slightly tackier.

The polymer produced by the method of this invention has a unique combination of properties and these properties can be retained in paint formulations. The reasons for these unique properties are related to the composition. The composition is particularly noteworthy in its unusually high concentrations of styrene intimately distributed in the particles, and this distribution is largely the result of the two-step process. This provides film formation and film flexibility at concentrations of styrene that would typically produce brittleness. In turn, this high styrene tends to produce more unusual film properties including lower than normal tack. Excellent compatibility of all constituents and high stability both of which can be retained in paint compositions are probably responsible to a large degree for the excellent gloss retention.

One rather surprising result obtained in using the method of this invention is the very low concentrations of residual monomer obtained. In the usual polymerization, there may be as much as 20 to 30% residual monomer. With the present method, there is rarely as much as 2%. With such effective utilization of monomers, the customary steps required to remove residual monomer are omitted.

Since many embodiments may be made of this invention and since many changes may be made in the embodiments described, the foregoing is to be interpreted as illustrative only, and the invention is defined by the claims appended hereto.

We claim:

1. In a process of preparing an interpolymer emulsion that dries to a glossy, tack-free water-resistant film at ambient temperature by interploymerizing at least one monomer (A) that when polymerized alone is film-forming and forms a soft polymer, monomer (A) being selected from the group consisting of esters of acrylic acid and an alkanol of up to eight carbon atoms and esters of methacrylic acid and an alkanol of four to twelve carbon atoms;

at least one polymerizable monovinylidene aryl monomer (B) that when polymerized by itself is non-film-forming and forms a hard polymer, monomer (B) being selected from the group consisting of styrene, ring-substituted styrenes and mixtures thereof with an ester of methacrylic acid and an alkanol of up to three carbon atoms; and a monovinylidene, alpha, beta-unsaturated carboxylic acid monomer (C) of the formula

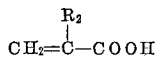

in which $R_2$ is seelcted from hydrogen, lower alkyl, $CH_2$—COOH and $CH_2$—$COOR_3$, $R_3$ being lower alkyl, in proportions such that 95 to 99.5% of the monomers (A) and (B) in a ratio of (A) to (B) in the range of 2:8 to 7:3 and correspondingly, 0.5 to 5% is monomer (C), the interpolymerization being performed by an aqueous emulsion interpolymerization reaction in the presence of a free-radical catalyst, the steps of interpolymerizing first at least 70% of the entire proportion of monomer (A) and up to 70% of the proportion of monomer (B) to form an interpolymer emulsion and then interpolymerizing in said emulsion the balance of monomer (B) and any balance of monomer (A), at least one of said stages of interpolymerization including at least part of monomer (C) and the other stage including any balance of monomer (C), the first interpolymerization being brought essentially to completion before the second is begun.

2. In a process of preparing an interpolymer emulsion that dries to a glossy, tack-free water-resistant film at ambient temperature by interpolymerizing at least one monomer (A) that when polymerized alone is film-forming and forms a soft polymer, monomer (A) being selected from the group consisting of esters of acrylic acid and an alkanol of up to eight carbon atoms, and esters of methacrylic acid and an alkanol of four to twelve carbon atoms;

at least one polymerizable monovinylidene aryl monomer (B) that when polymerized by itself is non-film-forming and forms a hard polymer, monomer (B) being selected from the group consisting of styrene, ring-substituted styrenes and mixtures thereof with an ester of methacrylic acid and an alkanol of up to three carbon atoms; and a monovinylidene, alpha, beta-unsaturated carboxylic acid monomer (C) of the formula $$CH_2=\overset{R_2}{\underset{}{C}}-COOH$$

in which $R_2$ is selected from hydrogen, lower alkyl, —$CH_2$—COOH and —$CH_2$—$COOR_3$, $R_3$ being lower alkyl,
in proportions such that 95 to 99.5% of the monomer is monomers (A) and (B) in a ratio of (A) to (B) in the range of 2:8 to 7:3 and correpsondingly, 0.5 to 5% is monomer (C), the interpolymerization being performed by an aqueous emulsion interpolymerization reaction in the presence of a free-radical catalyst, the steps of interpolymerizing first the entire proportion of monomer (A) and from 10 to 70% of the proportion of monomer (B) to form an interpolymer emulsion and then interpolymerizing in said emulsion the balance of monomer (B), at least one of said stages of itnerpolymerization including at least part of monomer (C) and the other stage including any balance of monomer (C), the first interpolymerization being brought essentially to completion before the second is begun.

3. The method of claim 2 in which monomer (A) is an ester of acrylic acid.

4. The method of claim 3 in which monomer (B) is styrene.

5. The method of claim 3 in which monomer (B) is vinyl toluene.

6. The method of claim 2 in which monomer (A) is ethyl acrylate, monomer (B) is styrene and the ratio of monomer (B) to monomer (A) is in the range of 70:30 to 33:67.

7. The method of claim 6 in which the monovinylidene carboxylic acid is methacrylic acid and at least 10% of the weight thereof is included in the first step of polymerization.

8. The method of claim 6 in which the carboxylic acid is itaconic acid.

9. The method of claim 6 in which the carboxylic acid is acrylic acid.

10. The method of claim 2 in which monomer (A) is butyl acrylate, monomer (B) is styrene and the ratio of monomer (B) to monomer (A) is in the range of 60:40 to 30:70.

11. The method of claim 10 in which the carboxylic acid is methacrylic acid.

12. The method of claim 2 in which monomer (A) is 2-ethylhexyl acrylate, monomer (B) is styrene and the ratio of monomer (B) to monomer (A) is in the range of 55:45 to 25:75.

13. The method of claim 12 in which the carboxylic acid is methacrylic acid.

14. The method of claim 1 in which a cross-linking agent is included in the second of the polymerization steps in an amount up to 5% of the total weight of the other monomers.

15. The method of claim 14 in which the cross-linking agent is selected from the group consisting of divinyl benzene, diallyl itaconate, and polyethyleneglycol dimethacrylate.

16. The method of claim 1 in which there is included in said first interpolymerizing step up to 5% of a monomer selected from the group of alkyl acrylate esters of 9 to 18 carbon atoms and alkyl methacrylate esters of 13 to 18 carbon atoms.

17. An interpolymer emulsion that dries at ambient temperature to a glossy, gloss-retentive, tack-free cohesive and adhesive film, said emulsion being produced by the process of claim 1.

18. An interpolymer emulsion that dries at ambient temperature to a glossy- gloss-retentive, tack-free cohesive and adhesive film, said emulsion being produced by the process of claim 6.

19. An interpolymer emulsion that dries at ambient temperature to a glossy, gloss-retentive, tack-free cohesive and adhesive film, said emulsion being produced by the process of claim 10.

20. An interpolymer emulsion that dries at ambient temperature to a glossy, gloss-retentive, tack-free cohesive and adhesive film, said emulsion being produced by the process of claim 12.

References Cited by the Examiner

UNITED STATES PATENTS

| | | | |
|---|---|---|---|
| 2,726,230 | 12/1955 | Carlson | 260—29.6 |
| 2,767,153 | 10/1956 | Sutton | 260—29.6 |
| 2,790,736 | 4/1956 | McLaughlin et al. | 260—29.6 |
| 2,837,444 | 6/1958 | Hahn | 260—29.6 |
| 2,961,421 | 11/1960 | Cohen | 260—29.6 |
| 2,962,465 | 11/1960 | Lindstrom et al. | 260—29.6 |

MURRAY TILLMAN, *Primary Examiner.*

DANIEL ARNOLD, LEON J. BERCOVITZ, *Examiners.*